Nov. 8, 1955  A. F. BECKER  2,722,841
REVERSING MECHANISM
Filed May 17, 1950
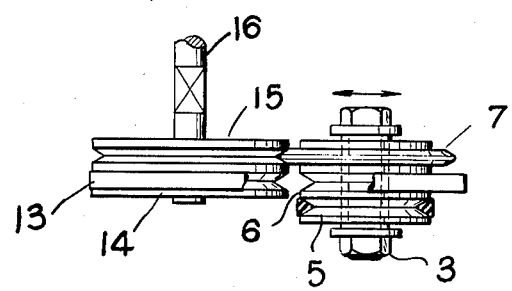
Fig. 3
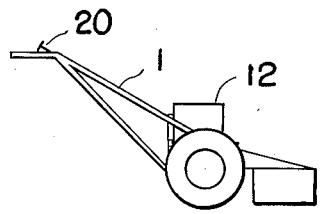
Fig. 4
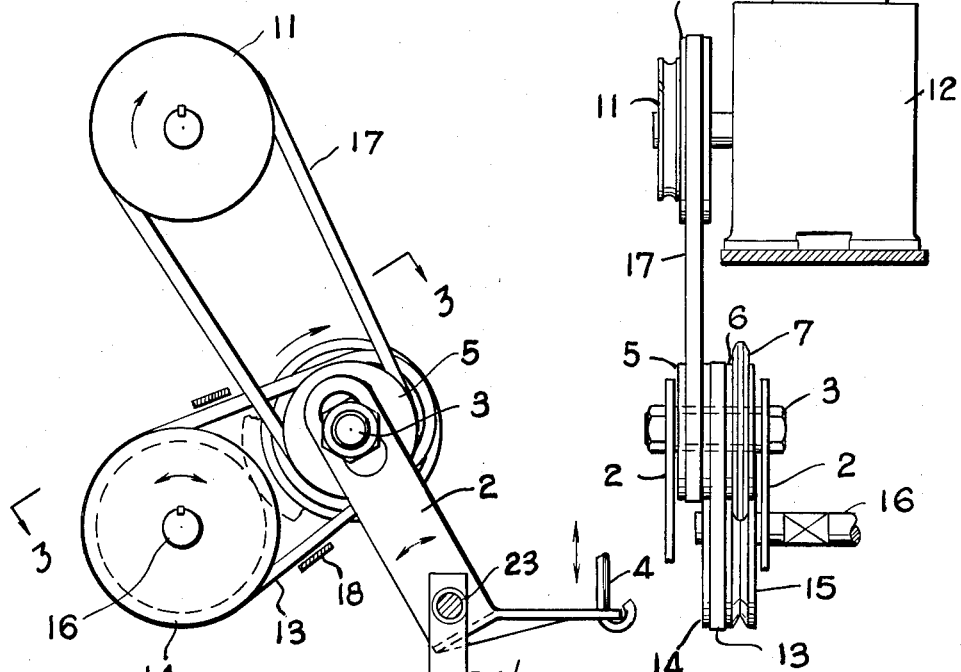
Fig. 1
Fig. 2
INVENTOR.
Anthony F. Becker
BY
Ranseler O. Wyatt.

United States Patent Office 2,722,841
Patented Nov. 8, 1955

2,722,841

REVERSING MECHANISM

Anthony F. Becker, Houston, Tex.

Application May 17, 1950, Serial No. 162,424

4 Claims. (Cl. 74—203)

This invention relates to new and useful improvements in a reverse mechanism for power driven lawn mowers and the like.

It is an object of this invention to provide a reverse mechanism for power driven lawn mowers, and the like, that may be cheaply and easily manufactured and readily applied.

It is another object of the invention to provide a reverse mechanism for power driven lawn mowers, and the like, that is of a sturdy character, not readily damaged by dust, dirt, oil or grease and that eliminates the necessity of a clutch and shaft mechanism.

It is still another object of the invention to provide a mechanism that will quickly and easily move the driving mechanism of a power mower, or the like, into forward, neutral or reverse position.

With the above and other objects in view, the invention has relation to certain novel features of construction and operation more particularly set forth in the following specifications and illustrated in the accompanying drawings, wherein:

Figure 1 is a side elevational view, showing the reversing mechanism mounted on a machine.

Figure 2 is a side elevational view of the view shown in Figure 1.

Figure 3 is a top plan view, taken on the line 3—3 of Figure 1, and

Figure 4 is a diagrammatic view of a machine to which the device is adapted to be attached.

Referring now more particularly to the drawings, the numeral 1 indicates a power driven lawn mower framework, or the like, on which the U-shaped bracket 2 is pivotally mounted as at 23. The lower end of the bracket 2 is connected to suitable control means as 4. Mounted in the bracket 2 is an axle 3 on which are mounted the driven pulley 5, the driving pulley 6 and the reverse wheel 7. The reverse wheel 7 is composed of pressed, reinforced, asbestos of suitable coefficient friction and is of a greater circumference than the pulley 6 and pulley 5.

A driving belt 17 leads from the pulley 10 of the motor and over the pulley 5. The usual cranking pulley 11 is provided on the motor 12. The driving pulley 6 has a belt 13 mounted thereon which is also mounted on the driven pulley 14, said pulley 14 being mounted on the differential shaft 16 leading to the usual differential mechanism (not shown). A reversing wheel 15 is also mounted on the differential shaft 16.

As the motor rotates, the driving mechanism mounted on the axle 3 constantly turns in every adjustment, the bracket 2 moving on an arc to maintain the tension constant on the belt 17. When it is desired to move the driving mechanism into driving relation with the differential shaft 16, the shift 20 is manipulated, rocking the bracket 2 outwardly into extended position, tightening the belt 13, and rotating the driven pulley 14 and differential shaft 16. When it is desired to move the device into reverse, the shift 20 is manipulated to rock the bracket 2 inwardly, relieving the tension on the belt 13, permitting the pulley 6 to turn without rotating the belt 13 and bringing the reversing wheel 15 into contact with the reversing wheel 16, turning the differential in the opposite direction, causing a reverse movement of the entire machine. The outer periphery of the reversing wheel 7 is preferably wedge shaped, the outside edges thereof being beveled inwardly, and the reversing wheel 15 being channeled, will receive the periphery of the wheel 7 snugly and as the periphery of the wheel 7 wears down, the fit with the wheel 15 becomes gradually tighter, and the friction surface greater, increasing the friction coefficient. The pulleys herein referred to are of any desired material having a smooth finish to provide friction with their respective belts, and the wheel 7 is preferably of a pressed reinforced material, such as asbestos or other heat resisting material and any dirt, water or sand, or the like, contacting the wheel 7 during operation of the machine will be discharged therefrom by virtue of the centrifugal action of the wheel 7, and the friction coefficient thereof thus maintained.

When using the device herein described, the bracket 2 may be moved into neutral position by movement of the shift lever 20, which is in operative connection with and part of the control means 4, and the engine 12 readily cranked. In this position there is no load on the engine 12, the belt 13 remaining stationery, the guide 18 holding the belt in inactive position and away from the pulley 6 as shown in Figure 1, the pulley 6 turning freely without engaging the belt 13. If the machine is on an incline, the differential may be engaged in the usual manner (not shown) and the bracket 2 moved into neutral position as above described, thus locking the machine in position even through the motor continues to operate.

As may be readily seen, with applicant's device, even though the reverse wheel may be out of order, the machine may still be used in forward movement without damage to the machine or any of its parts.

While the foregoing is considered to be a preferred form of the invention by way of illustration, the broad principle of the invention will be defined by the appended claims.

What I claim is:

1. In a directional control mechanism, a framework, a source of power mounted on said framework, driving wheels supporting said mechanism, and a differential shaft adapted to be driven, comprising a pivotally mounted bracket on said framework, a series of pulleys and a friction plate coaxially and rotatably mounted on said bracket and being adjustable thereon with relation to said source of power, means leading from said source of power to said series of pulleys adapted to constantly rotate said pulleys, means leading from said constantly rotated pulleys to selectively rotate the differential shaft pulley in one direction, said friction plate being adapted to be brought into frictional contact with and to reverse the direction of rotation of said differential shaft pulley, said friction plate having a wedge shaped periphery and said differential shaft pulley having channel shaped periphery to receive said friction plate periphery.

2. In a reversing mechanism for power driven lawn mowers, a pulley mounted on the drive shaft from a suitable source of power, a pulley mounted on the differential shaft of a mower, a pulley coaxially mounted on said differential shaft having a channel shaped periphery, a movable bracket mounted on the framework of the mower, a pair of pulleys and a friction plate having a wedge shaped periphery coaxially mounted on said bracket, a belt mounted under tension on said drive shaft pulley and on one of said pair of pulleys adapted to rotate said coaxially mounted pulleys and friction plate, a belt mounted on the other of said pair of pulleys and said differential shaft pulley, means for rocking said bracket in a suitable arc to maintain constant tension between said drive shaft pulley and said pair of pulleys and for disengaging said differential shaft belt and for moving said wedge shaped periphery of said friction plate into frictional engagement with the channel shaped pulley coaxially mounted on said differential shaft.

3. In a driving mechanism control, a source of power, a supporting axle rotated by said source of power, a plurality of pulleys on said axle, a driven shaft adapted to be rotated by said drive axle, adjustable means joining said source of power and one of said pulleys on said axle in constant rotating relation, means for releasably joining said driven shaft in rotating relation with one of said pulleys on said axle, a friction plate rotatably mounted on said axle, a grooved disc rotatably mounted on said driven shaft and means for moving said last mentioned pulley out of driving relation with said driven shaft and for moving said friction plate on said axle into contact with said grooved disc on said driven shaft reversing the direction of rotation.

4. In a directional control mechanism, a framework, a pivotally mounted bracket on said framework having means for selectively determining the position of said bracket, a drive shaft mounted on the free end of said bracket and being longitudinally adjustable, a pair of pulleys mounted on said drive shaft, a source of power, means connecting one of said pulleys and said source of power in a constantly rotating relation, a friction plate mounted on said drive shaft, a driven shaft, a pair of pulleys mounted on said driven shaft, means for releasably connecting one of said pulleys with one of the pulleys on said drive shaft for movement of said driven shaft in one direction and the other pulley on said driven shaft being in alignment with said friction plate on said drive shaft and adapted to be contacted thereby to move said driven shaft in the other direction.

References Cited in the file of this patent

UNITED STATES PATENTS

| 450,302 | Soule | Apr. 14, 1891 |
| 673,071 | Adamson | Apr. 30, 1901 |
| 783,037 | Herby | Feb. 21, 1905 |
| 912,131 | Jenkins | Feb. 9, 1909 |
| 948,091 | Geer | Feb. 1, 1910 |
| 1,072,165 | Price | Sept. 2, 1913 |
| 1,236,749 | Osser | Aug. 14, 1917 |
| 1,477,052 | Gibbs | Dec. 11, 1923 |
| 1,601,530 | Ireland et al. | Sept. 28, 1926 |
| 2,267,478 | Stechbart | Dec. 23, 1941 |
| 2,475,671 | McCartney | July 12, 1949 |

FOREIGN PATENTS

| 597,513 | France | Aug. 31, 1925 |